United States Patent [19]

Kampf et al.

[11] 4,396,751
[45] Aug. 2, 1983

[54] HOMO- AND COPOLYMERS OF 1,3-DIENES CONTAINING REACTIVE SILYL GROUPS, AND THEIR PREPARATION AND USE

[75] Inventors: Wolfgang Kampf, Haltern; Roland Streck; Horst G. Haag, both of Marl, all of Fed. Rep. of Germany

[73] Assignee: Chemische Werke Huels Aktiengesellschaft, Marl, Fed. Rep. of Germany

[21] Appl. No.: 273,289

[22] Filed: Jun. 15, 1981

[30] Foreign Application Priority Data

Jul. 30, 1980 [DE] Fed. Rep. of Germany ....... 3022898
Jul. 30, 1980 [DE] Fed. Rep. of Germany ....... 3028839

[51] Int. Cl.³ .................... C08F 236/06; C08F 279/02
[52] U.S. Cl. .................................. 526/279; 525/288; 556/431; 556/435; 556/466
[58] Field of Search ................. 525/288; 526/279; 556/431, 435, 466

[56] References Cited

U.S. PATENT DOCUMENTS

| | | | |
|---|---|---|---|
| 2,475,122 | 7/1949 | Barry et al. | 260/85.1 |
| 2,557,778 | 6/1951 | Barry | 154/128 |
| 2,952,576 | 9/1960 | Wheelock et al. | 154/46 |
| 3,244,664 | 4/1966 | Zelinski et al. | 260/41.5 |
| 3,440,302 | 4/1969 | Spaier et al. | 260/37 R |
| 3,470,226 | 9/1969 | Plumb et al. | 260/448.8 |
| 3,655,633 | 4/1972 | Saam | 260/79 |
| 3,719,650 | 3/1973 | Joy | 260/89.5 A |
| 3,726,943 | 4/1973 | Joy | 260/37 SB |
| 3,746,611 | 7/1973 | Joy | 161/206 |
| 3,759,869 | 9/1973 | Skeist et al. | 260/41.5 R |
| 3,772,349 | 11/1973 | Joy | 260/448.2 B |
| 3,772,353 | 11/1973 | Joy | 260/448.2 N |
| 3,857,825 | 12/1972 | Streck et al. | 260/4 R |
| 3,881,536 | 6/1975 | Dorau et al. | 152/330 |
| 3,920,714 | 11/1975 | Streck | 260/4 R |
| 3,920,715 | 11/1975 | Streck et al. | 260/4 R |
| 3,929,850 | 12/1975 | Streck et al. | 260/4 R |
| 4,183,844 | 1/1980 | Streck et al. | 260/42.15 |

FOREIGN PATENT DOCUMENTS

| | | |
|---|---|---|
| 1720527 | 7/1971 | Fed. Rep. of Germany . |
| 2333566 | 1/1975 | Fed. Rep. of Germany . |
| 2333567 | 1/1975 | Fed. Rep. of Germany . |

OTHER PUBLICATIONS

Journal of Applied Polymer Science, vol. 18, pp. 3259-3265.

*Primary Examiner*—Wilbert J. Briggs, Sr.
*Attorney, Agent, or Firm*—Millen & White

[57] ABSTRACT

A homo- or copolymer of a 1,3-diene having reactive silyl groups bound thereto, and containing 0.4-12% by weight of bound silicon, prepared by reacting at a temperature of 150°-300° C., a 1,3-diene homo- or copolymer, having less than 1% of its aliphatic double bonds conjugated and having a molecular weight ($\overline{M}_n$) of 400-8,000, with a silicon compound of the formula

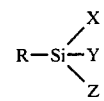

wherein
R is an unsaturated aliphatic hydrocarbon residue of 2-20 carbon atoms,
X is halogen, $C_{1-6}$ alkoxy, $C_{1-6}$ alkoxyalkoxy, $C_{6-12}$ aryloxy, $C_{1-8}$ alkanoyloxy, $C_{1-6}$ ketoximato or $C_{1-8}$ hydrocarbylamido,
Y and Z independently are one of the X groups, hydrogen, alkyl of 1-8 carbon atoms, cycloalkyl of 5-12 carbon atoms, or optionally substituted phenyl.

6 Claims, No Drawings

HOMO- AND COPOLYMERS OF 1,3-DIENES CONTAINING REACTIVE SILYL GROUPS, AND THEIR PREPARATION AND USE

BACKGROUND OF THE INVENTION

It is known to use carbon blacks of various specifications as components of elastomer mixtures. These are added less for the purpose of making the resultant vulcanizates less expensive than to optimize their overall properties for various applications. Among these are, above all, tear strength, modulus of elasticity, hardness, tear propagation resistance and abrasion resistance. Carbon black is thus designated as a so-called active or reinforcing filler.

However, the use of carbon black in elastomer mixtures is limited for various reasons. On the one hand, only black mixtures or in any event no colored or white mixtures, can be manufactured. On the other hand, good carbon blacks have become quite expensive compared with economical mineral fillers, such as silicic acid ($SiO_2$), kaolin, aluminum hydroxide and glass. As a result, increasing efforts have been made to replace carbon black by fillers, such as those recited above, all of which are also light colored. Such replacement has the further significant advantage of reducing the proportion of components based on crude oil, which is subject to supply crises. Moreover, the utilization of highly active silicic acids is of great advantage for optimizing certain properties, such as, for example, notch impact strength.

Such light-colored mineral fillers have been used in the past primarily only from an economic viewpoint. Initially, considerable impairment in important end use properties had to be tolerated, such as, for example, impairments in heat degradation, elasticity, and compression set. Similar problems also exist in the filling or reinforcement of other polymeric materials with mineral fillers, for example polyolefins or unsaturated polyester resins.

These disadvantages have been overcome at least partially by the use of so-called adhesion promoters. Generally speaking, these are compounds exhibiting a certain affinity to the polymer as well as to the filler, preferably by entering into a chemical reaction with the two substrates.

Especially well-known adhesion promoters are the organofunctional silanes. They have the formula R-$SiX_3$ wherein X in most cases is alkoxy and less frequently is halogen, and the organic residue R is an alkyl or aryl group substituted by a functional group. These compounds yield polymer-filler combinations having satisfactory properties; nevertheless, they do exhibit several disadvantages in use. For example, various silanes can be optimally used in vulcanizable elastomer-filler mixtures only for a specific type of crosslinking technique in each case. Unpleasant odors also occur, for example, when using the mercaptosilanes. Moreover, the mixtures crosslinked by the silanes tend toward premature vulcanization (scorch). Furthermore, compared with the other components of the elastomer mixtures, organofunctional silanes are extraordinarily expensive and generally exhibit a toxicity with respect to inhalation and skin contact which cannot be ignored.

A number of attempts have been made to achieve similar effects of the adhesion promoters by synthesizing them on a polymeric basis. For example, natural rubber and styrene-butadiene elastomer (SBR) can be hydrosilylated by heating with trichlorosilane to about 300° C. (U.S. Pat. No. 2,475,122); such reaction products adhere well to glass plates (U.S. Pat. No. 2,557,778).

The photochemical hydrosilylation of a liquid polybutadiene obtained by anionic polymerization is described in U.S. Pat. No. 2,952,576, which relates to glass fibers coated with this material for the reinforcement of unsaturated polyester resins. The microstructure of the liquid polybutadiene is not mentioned. However, from the details of its production from a sodium suspension, in conjunction with a comparison of data from the literature, it can be concluded that this polymer contains about 60–70% of vinyl groups, 30–20% of trans-vinylene groups and only about 10% of cis-vinylene groups.

The catalysis of hydrosilylation of polybutadienes by platinum compounds is described as an intermediate stage in the production of foam stabilizers or laminating resins, respectively, in DOS's [German Unexamined Laid-Open Applications] 1,620,934 and 1,720,527. These DOS's do not suggest the use of the reaction products in connection with rubber-filler mixtures. Furthermore, as above, both cases involve products having a high content of vinyl groups, the remaining double bonds consisting predominantly of trans-vinylene groups. Polybutadienes of such microstructure exhibit a very high viscosity at room temperature even at relatively low molecular weights; as a result of this consistency, their handling, dosing, and intermixing are extraordinarily difficult. The same limitation applies to their hydrosilylated derivatives.

The conventional Pt catalysis of the hydrosilylation is also described in U.S. Pat. No. 3,759,869 whose polymers have molecular weights of between 500 and 50,000 and contain to an extent of at least 25% by weight the structure

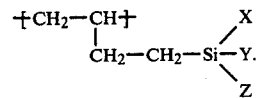

In the case of pure polybutadiene as the basic polymer, this provides a reactive silyl group —$SiX_3$ at about each tenth monomer unit. The examples merely disclose the hydrosilylation of a polybutadiene having an average molecular weight of 1,000 and a vinyl group content of 90%, based on the total number of double bonds, with practically 100% saturation of all vinyl groups present. Mixtures of such products and/or their derivatives obtained by secondary reactions with low molecular weight polypropylene (molecular weight 5,000) or EPM elastomer are merely mentioned without anything being said about their effectiveness. Additionally, these most extensively saturated polybutadiene derivatives and/or fillers provided therewith solely due to the lack of double bonds are only poorly suited for forming a composite with a polymer network produced by sulfur or peroxide vulcanization.

DOS No. 2,343,108 claims the hydrosilylation of elastomer polymers containing, preferably, at least 5–30% by weight of vinyl groups, and their use as coupling agents for the vulcanization of a vulcanizable elastomer comprising a silicic-acid-containing pigment. These are products which can only be used in solution due to their high molecular weight.

In contrast, DAS [German Published Application] No. 2,635,601 describes hydrosilylation products of specific polybutadiene oils with molecular weight of 400–6,000, which, thanks to their microstructure (10–60% vinyl groups, 1–15% trans-vinylene groups, and 25–85% cis-vinylene groups), exhibit particularly low viscosities and thus can be handled readily in undiluted form. However, the hydrosilylation products have the disadvantage that the platinum catalyst used during their manufacture extensively remains in the product and thus is lost.

The reaction of lithium-terminated "living polymers" with an excess of a tetrahalo- or tetraalkoxysilane is described by U.S. Pat. No. 3,244,664. This excess, which must be employed to avoid coupling or cross-linking reactions, is practically inseparable and, accordingly, is lost to further processing.

Furthermore, German Patent Application No. P 30 10 113.4 discloses homo- or copolymers carrying reactive silyl groups, made from 1,3-dienes, which contain 0.4–9% by weight of bound silicon and are obtained at a temperature of 0°–80° C. by reating a metallized 1,3-diene homo- or copolymer having a molecular weight ($\overline{Mn}$) of 400–8,000 with a silicon compound of the formula

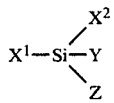

wherein
$X^1$ is halogen or alkoxy,
$X^2$ is a hydrolyzable group,
Y and Z can be identical to $X^2$ but can also be hydrogen, alkyl of 1–8 carbon atoms, cycloalkyl of 5–12 carbon atoms or optionally substituted phenyl.

The addition of sulfhydryl groups of a mercaptosilane, e.g., γ-mercaptopropyltriethoxysilane, to double bonds of an unsaturated polymer has been repeatedly described (e.g., in U.S. Pat. No. 3,440,302, DOS's Nos. 2,333,566 and 2,333,567), but has the disadvantage of a very expensive and foul-smelling starting material.

Furthermore, processes are known which produce polymers having reactive silyl groups by using silyl-group-containing peroxy compounds (DOS's Nos. 2,152,295 and 2,152,286) or azo compounds (J. Appl. Pol. Sci. 18: 3259 [1974]) as the initiators or by using silyl-group-containing disulfides (DOS No. 2,142,596) as chain-transfer agents of the radical polymerization. Here again, the auxiliary agents used to introduce the silyl groups are only accessible with difficulty, are very expensive, and in most cases, are not commercially available at all. In addition, a maximum of two reactive silyl groups, i.e., at the ends of the polymer chain, can be introduced in this way. Products with a higher silicon content, which may be desirable for obtaining certain effects such as increased self-crosslinking ability, consequently, cannot be produced.

Silyl-group-containing polyalkenamers can be readily prepared using silyl olefins (German Pat. No. 2,157,405) or silyl cycloolefins (DAS No. 2,314,543) as regulators or (co-) monomers in the ring-opening polymerization of cycloolefins; however, the economic availability of these reactants is also a limiting factor for general application.

Finally, homo- or copolymers of 1,3-dienes carrying reactive silyl groups, are known from German Patent Application No. P 30 03 893.8, corresponding to U.S. Application Ser. No. 230,483, filed on Feb. 2, 1981, whose disclosure is incorporated by reference herein. These contain 0.4–12% by weight of bound silicon and are obtained by reacting, at a temperature of 190°–300° C., a 1,3-diene homo- or copolymer, containing more than 1% of its aliphatic double bonds in conjugation and having a molecular weight ($\overline{Mn}$) of 400–6,000, with a silicon compound of the formula

wherein
R is an unsaturated cyclo or acyclic aliphatic hydrocarbon residue of 2–20 carbon atoms,
X is a hydrolyzable residue,
Y and Z are the same as X, hydrogen, or alkyl of 1–8 carbon atoms, cycloalkyl of 5–12 carbon atoms, or an optionally substituted phenyl residue.

SUMMARY OF THE INVENTION

It is an object of the present invention to provide silylated polymeric products preparable using readily accessible and inexpensive polymeric starting materials, which can be used in their commercially available form directly after polymerization without loss of valuable noble metals or any expensive metallizing treatment, using simplified processing conditions; and which products have a reactive silyl group content that can be varied within wide limits.

Upon further study of the specification and appended claims, further objects and advantages of this invention will become apparent to those skilled in the art.

These objects have been attained according to this invention by providing homo- or copolymers of 1,3-dienes having reactive silyl groups bound thereto, the bound silicon content being 0.4–12% by weight, and obtained by reacting a 1,3-diene homo- or copolymer whose aliphatic double bonds are less than 1% conjugated (e.g., 0,2–0,6% conjugated) which have a molecular weight ($\overline{Mn}$) of 400–8,000 with silicon compounds of Formula I

wherein
R is an unsaturated (cyclo-) aliphatic hydrocarbon residue of 2–20 carbon atoms and
X is a hydrolyzable residue,
Y and Z independently are X, hydrogen, an alkyl residue of 1–8 carbon atoms, a cycloalkyl residue of 5–12 carbon atoms, or an optionally substituted phenyl residue, at a temperature of 150°–300° C., optionally in the presence of stabilizers suppressing the free radical polymerization of the unsaturated silanes, e.g., tert-butyl pyrocatechol or hydroquinone (e.g., in amounts of 0.01 to 0.5% based on the weight of the polymer).

DETAILED DISCUSSION

Accordingly, starting compounds for the silyl-group-carrying polymers of this invention are, on the one hand, 1,3-diene homo- and copolymers having molecular weights ($\overline{M}n$) of 400–8,000 (as measured by gel permeation chromatography), and conjugated double bond contents of less than 1%, and, on the other hand, the unsaturated silicon compounds of Formula I.

Homo- and copolymers of 1,3-dienes are understood to mean the following within the scope of this invention; homopolymers of, for example, 1,3-butadiene, isoprene, 2,3-dimethylbutadiene, and piperylene; copolymers of these 1,3-dienes with one another; copolymers of these 1,3-dienes with vinyl-substituted aromatic compounds, e.g., styrene, α-methylstyrene, vinyltoluene, and divinylbenzene; as well as reaction products of conjugated 1,3-dienes and aromatic hydrocarbons prepared according to the process of Japanese Laid-Open Application No. 49-32985 and German Patent Applications P 28 48 804.2 and P 30 00 708.0, all of whose disclosures are incorporated by reference herein. Preferred polybutadienes have molecular weights ($\overline{M}n$) of 600–3,000. The microstructure of the dienes in the homo- and copolymers and/or in the aforementioned reaction products is not critical. In general, homo- or copolymers are used having the following double bond distribution:

0–60% vinyl groups
1–25% trans-vinylene groups
5–85% cis-vinylene groups.

In addition, up to 40% alicyclic structures can be present.

Such products can be manufactured according to any of many prior-art processes (for example, German Pat. No. 1,186,631; DAS No. 1,212,302; German Pat. No. 1,292,853; DOS No. 2,361,782; and DOS No. 2,342,885, all of whose disclosures are incorporated by reference herein.

Conjugated double bond contents are determined by conventional U.V. spectroscopic procedures for detecting dienes, triene and tetraene etc. structures.

According to this invention, the reactive silyl groups are introduced into the 1,3-diene homo- or copolymer by reaction with a silicon compound of Formula I. In Formula I, R is an unsaturated aliphatic hydrocarbon residue of 2–20, preferably 2–6 carbon atoms; X is a hydrolyzable residue, i.e., hydrolyzable in the presence of water and preferably a polycondensation catalyst, e.g., halogen, preferably chlorine and bromine, alkoxy or alkoxyalkoxy, preferably of up to 6 carbon atoms, aryloxy, preferably of 6–12 carbon atoms, carboxylate based on a hydrocarbon, e.g., alkanoyloxy, preferably of up to 8 carbon atoms, ketoximato, based on a hydrocarbon preferably of up to 6 carbon atoms in the keto group; or amido, based on a hydrocarbon of preferably up to 12 carbon atoms. Equivalents of these X groups are also included. Y and Z can be the same as X, but can also be hydrogen, alkyl of 1–8 carbon atoms, cycloalkyl of 5–12 carbon atoms, or optionally substituted phenyl e.g., phenyl or phenyl substituted by halogen and/or alkyl.

Typical representatives of the unsaturated organosilanes include, for example, vinyltrichlorosilane, vinyltrimethoxysilane, vinyltriethoxysilane, vinyltris(methoxyethoxy)silane, vinylmethyldimethyloxysilane, vinyldimethylchlorosilane, allylmethylbutylchlorosilane, allylethyldibromosilane, allyldimethylacetoxysilane, allyltriisopropoxysilane, allylphenyldiphenoxysilane, methallylbutylchlorobromosilane, crotylmethylpropyliodosilane, ω-undecenylfluorochlorobromosilane, octadecen-(9)-yltriacetoxysilane, and vinyldimethylketoximathomethoxychlorosilane.

Preferred are vinyl- and allylsilanes with X=halogen or alkoxy which can be removed by hydrolysis, for example vinyltrichlorosilane, vinylmethyldichlorosilane, vinylmethylethylchlorosilane, vinyltrimethoxysilane, vinyltriethoxysilane, vinylmethyldibutoxysilane, allyltribromosilane, and allylethylmethoxypropoxysilane.

Among the unsaturated halosilanes, those with chlorine as the halogen are, in turn, preferred, so that, for example, vinyltrichlorosilane, vinylmethyldichlorosilane, vinyldimethylchlorosilane, and allyltrichlorosilane are especially preferred.

The chlorosilyl groups introduced with these compounds can optionally be converted into other reactive silyl groups, for example, during the course of the processing step, e.g., by adding, preferably, alcohols, trialkyl orthoformates, epoxides, sodium acetate, etc. according to conventional prior art reactions.

Such a conversion, however, generally utilized to avoid subsequent HCl release, can be omitted if the liquid hydrosilylation product is advantageously applied directly to a mineral filler and care is taken that the hydrochloric acid liberated during this reaction is removed; this hydrochloric acid is obtained in this case as dry gaseous hydrogen chloride, rather than as a solution in alcohol or alkyl chloride, i.e., it can be passed on to further use.

From the class of compounds of the unsaturated alkoxysilanes, those having alkoxy residues of 1–4 carbon atoms are particularly advantageous. Preferred representatives in this connection are vinyltrimethoxysilane, vinyltriethoxysilane, vinylmetoxydiethoxysilane, vinylmethylmethoxypropoxysilane and allylpropylpropoxybutoxysilane. Quite especially preferred is the use of vinyltrimethoxysilane, vinyltriethoxysilane, vinylmethyldimethyloxysilane, and vinylmethyldiethoxysilane. By using these unsaturated alkoxysilanes, the advantage is obtained that working up of the addition products can practically be omitted or can be restricted to the distillative removal of any residues of unreacted alkenylalkoxysilane. Such residues, though not adversely affecting the suitability of the products as adhesion promoters, reduce their flash point to a marked extent due to their volatility, whereby one of the advantages of the products of this invention is lessened.

The addition reaction between the 1,3-diene homo- or copolymers and the unsaturated silicon compounds of Formula I is generally conducted by heating the reactants to temperatures of 150°–300° C., preferably 200°–280° C., under an inert gas. The unsaturated silane is generally employed up to a tenfold molar excess based on the polymer. The reaction times are generally 1–12 hours, preferably 3–6 hours, depending on the reaction temperature selected.

Elevated pressure is necessary for the addition reaction only insofar as the vapor pressure of the unsaturated silane at the selected reaction temperature is >1 bar. The addition of the unsaturated silane to the 1,3-diene homo- or copolymer can also be conducted in the presence of an organic solvent. However, care must be taken that the apparatus is designed for the pressure which may be built up.

The especially low viscosity of the suitable 1,3-diene homo- and copolymers facilitates the conductance of the addition reaction, since the latter can thus be accomplished in general without adding an otherwise required solvent. It also makes it easier to work up and handle the addition products. The mode of operation used in production thereby not only becomes more economical but also more advantageous from an ecological viewpoint. It is neither necessary to consume solvents nor to discharge them subsequently into wastewaters or into the atmosphere.

The homo- or copolymers of 1,3-dienes carrying reactive silyl groups are worked up, when required at all, by withdrawing unreacted silane under vacuum.

The desired content of bound silicon of 0.4–12% by weight, preferably 1–5% by weight, and/or the added quantity of unsaturated silane, and thus the number of reactive silyl groups present on the average in the addition product, can be adjusted by selection of the quantity of silane introduced.

This content is primarily dependent on the specific intended end use of the addition product. Thus, as increase in the content of reactive silyl groups raises the reactivity of the addition products and their tendency to form a network of higher crosslinking density by polycondensation of the silanol groups formed after hydrolysis. These properties can be valuable, for example, in a number of applications of the homo- or copolymers of 1,3-dienes carrying reactive silyl groups according to this invention, for instance in the field of adhesives (glues), insulating compounds, and sealing compounds.

However, the addition compounds of this invention are used primarily as adhesion promoters in the production of mixtures of polymers, preferably elastomers, mineral fillers, and optionally further additives. They can either be applied prior to production of the mixture, in bulk or in solution, onto the mineral filler, or they can also be added to the mixture during its preparation.

Suitable mineral fillers include, for example, silicic acids ($SiO_2$) and silicates (such as kaolin, talc, asbestos, mica, glass fibers, glass beads, synthetic Ca, Mg, and Al silicates, Portland cement, blast furnace slag), aluminum hydroxide and oxide (hydrate)s, iron (hydr)oxide(s) etc. The contents of such fillers is generally 10–70% of the total weight of the resultant compositions, the content of the silylated polymers of this invention generally being 0.1–3%, preferably 0.3–2% on the same basis.

Usable elastomers include all customary types vulcanizable by peroxides and/or sulfur, such as, for example, natural rubber, synthetic polyisoprene, polybutadiene, styrene-butadiene copolymers, polyalkenamers (such as polypentenamers, polyoctenamers, or polydodecenamers), ethylene-propylene copolymers (EPM), ethylene-propylenediene terpolymers (EPDM), isobutene-isoprene copolymers (butyl elastomer), butadiene-acrylonitrile copolymers etc. Their content in these compositions is generally 15–90%, preferably, 25–80%, on the same basis.

In addition, even other polymers, such as, for example, polyethylene, polypropylene, polybutene, polyvinyl chloride, ethylene-vinyl acetate copolymers, polystyrene, can be reinforced by mineral fillers, with the aid of the polymeric adhesion promoters of this invention optionally with the addition of radical-forming agents, such as dicumyl peroxide.

It is furthermore possible to graft the silyl-group-carrying homo- and copolymers of 1,3-dienes of this invention to all aforementioned elastomeric and thermoplastic polymers by free radical reaction. This gives the reaction products the ability to crosslink by means of water. Catalysts which are used in silanol condensations can be added, if desired. These catalysts include, for example, di-n-butyltin dilaurate and tin(II) octoate.

Additives, which can be optionally added to the mixtures of polymers, preferably elastomers, mineral filler, and tackifier of this invention are understood to mean, above all, vulcanizing agents and plasticizers generally in amounts of 2–30% on the same basis as described above.

Vulcanizing agents include primarily sulfur in combination with the conventional vulcanization accelerators, with the addition of zinc oxide and higher fatty acids, such as, for example, stearic acid. With equal success, it is also possible to use for crosslinking purposes, peroxides or special sulfur donors, such as, for example, N,N'-morpholine disulfide or special thiurams.

Conventional refinery products are suitable as plasticizers. These include oils having predominantly aromatic, naphthenic, or paraffinic components. It is, of course, also possible to add any of the conventional antiaging agents.

The products of this invention are furthermore suitable as additives for improving the properties of adhesives, putties, sealing and caulking compounds; as agents for the dispersion of pigments, for making substrates hydrophobic, such as paper, textiles, wood, cardboard, and construction materials, as well as for floor strengthening.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way. In the following examples, all temperatures are set forth uncorrected in degrees Celsius, unless otherwise indicated, all parts and percentages are by weight.

As a test for the incorporation of the analytically determined silicon into the polybutadiene oil, the crosslinking capacity by water is measured. For this purpose, 2.0 g of the product is dissolved in 40 ml of hexane; 1.0 ml of a 5% solution of dibutyltin dilaurate in hexane is added thereto, and the solution is poured on water in a dish (surface area 600 cm$^2$). After standing for 24 hours at room temperature, a solid polymer film has been formed; after a drying step, the proportions of this film insoluble in toluene at room temperature (25° C.) are determined.

In all examples, conventional homo- and copolymers of 1,3-dienes are used as starting materials. In all cases, as is well known, these have <1% conjugated double bonds.

I. Preparation of the Products of This Invention

EXAMPLE 1

150 g of a polybutadiene oil ($\overline{M}_n$ 1,500; cis-1,4-content 72%, vinyl content <1%) was maintained together with 51 g of vinyltrichlorosilane in an autoclave under a nitrogen atmosphere for 5 hours at 225° C. During this period, the mixture was agitated. The amount of silane corresponded, with complete addition to the polymer, to a Si content of the product of 4.41% Si. An oil having a Si content of 2.65% was obtained after subsequent one-hour vacuum treatment at 130° C., i.e. 60.3% of the vinyltrichlorosilane used as the starting compound had been chemically added.

The crosslinking test yielded 99% insoluble proportions. The residual contents of vinylsilane determined by gas chromatography were <0.1%, as in the following examples.

EXAMPLES 2–10

Respectively 150 g of the polybutadiene oil serving as the starting compound in Example 1 was functionalized under a nitrogen atmosphere with vinyltrichlorosilane (VTClSi) using the conditions listed in the table below. The analytical data of the addition products can likewise be derived from Table 1.

TABLE 1

| Example No. | VTClSi [g] | T [°C.] | t [h] | Si Content [%] theoretical | Si Content [%] found | Gel Content [%] |
|---|---|---|---|---|---|---|
| 2 | 76.5 | 175 | 5 | 5.87 | 0.54 | 15 |
| 3 | 76.5 | 200 | 5 | 5.87 | 1.32 | 50 |
| 4 | 76.5 | 225 | 5 | 5.87 | 4.33 | 100 |
| 5 | 76.5 | 250 | 5 | 5.87 | 4.41 | 100 |
| 6 | 51 | 225 | 1 | 4.41 | 1.90 | 77 |
| 7 | 51 | 225 | 3 | 4.41 | 2.33 | 82 |
| 8 | 51 | 225 | 5 | 4.41 | 2.79 | 99 |
| 9 | 51 | 225 | 7.5 | 4.41 | 2.2 | 80 |
| 10 | 25.5 | 225 | 5 | 2.5 | 1.4 | 78 |

EXAMPLE 11

In place of the polybutadiene oil employed in Example 1, a higher-molecular oil ($\overline{M}_n$ 3,000) was utilized, having a cis-1,4-content of 80% and a vinyl content of <1%. With analogous conductance of the experiments in connection with Example 1, except for the reaction time, which was reduced to 3 hours, a product was obtained having 1.71% Si, the gel content of this product resulting in 82% insoluble proportions in accordance with the crosslinking test.

EXAMPLES 12 and 13

Example 1 was repeated, except that, in place of the polybutadiene oil utilized therein, oils were used having a different microstructure:

| Example No. | $\overline{M}_n$ | Microstructure [%] cis-1,4 | trans-1,4 | 1,2 | alicycl. | Remarks |
|---|---|---|---|---|---|---|
| 12 | 930 | 46 | 12 | 42 | 0 | Produced acc. to DOS 2,361,782 |
| 13 | 860 | 10 | 15 | 45 | 33 | Commercial Product "LITHENE" AL |

The manufacturing conditions and the characteristic data of the silylated polybutadienes are compiled in the following table:

| Ex. No. | VTClSi [g] | T [°C.] | t [h] | Si Content [%] theoret. | Si Content [%] found | Gel Content [%] |
|---|---|---|---|---|---|---|
| 12 | 51 | 225 | 3 | 4.41 | 2.9 | 97 |
| 13 | 51 | 225 | 5 | 4.41 | 2.4 | 66 |

EXAMPLE 14

The mode of operation of Example 1 was repeated with 120 g of vinyltriethoxysilane instead of 51 g of vinyltrichlorosilane. After a reaction period of 6 hours at 250° C. a product was obtained with 2.47% Si (theoretically 5.55%), yielding 94% insoluble proportions during the crosslinking test. The vinyltriethoxysilane removed by distillation, which was not added, had a purity of >90% (by gas chromatography) and could be reused.

II. Use of the Products of This Invention as Adhesion Promoters

EXAMPLE 15

The following mixtures on the basis of unsaturated ethylene-propylene elastomer (EPDM) with ethylidene norbornene as the ternary component are produced on a rolling mill:

TABLE 2

| | Mixture No. | | |
|---|---|---|---|
| | 1 | 2 | 3 |
| | Parts by Weight | | |
| EPDM, statistical type, ML$_{1+4}$ (100° C.) = 70 | 100.0 | 100.0 | 100.0 |
| Zinc oxide | 5.0 | 5.0 | 5.0 |
| Stearic acid | 2.0 | 2.0 | 2.0 |
| Silica | 120.0 | 120.0 | 120.0 |
| Naphthenic mineral oil plasticizer | 25.0 | 25.0 | 25.0 |
| Product of Example 8 | — | 2.0 | — |
| Product of Example 14 | — | — | 2.0 |
| Benzothiazyl-2-cyclohexylsulfenamide | 2.0 | 2.0 | 2.0 |
| Tetramethylthiuram disulfide | 1.0 | 1.0 | 1.0 |
| Sulfur | 1.5 | 1.5 | 1.5 |

The course of the vulcanization of these mixtures is determined by using a Zwick oscillating elastometer at 160° C. and with a deformation amplitude of 1° and 3 oscillations per minute. The following measurements are obtained:

TABLE 3

| | Mixture No. | | |
|---|---|---|---|
| | 1 | 2 | 3 |
| Time to crosslinking conversion of | | | |
| 10%, t$_{10}$(min) | 3.6 | 4.3 | 4.0 |
| 90%, t$_{90}$(min) | 19.2 | 12.3 | 12.3 |

The initial vulcanizing time $t_{10}$ is only slightly affected by the polymeric silicon compounds of this invention. However, the final vulcanizing time $t_{90}$ is reduced to almost one-half.

The 4 mm test specimens, vulcanized in a press for 20 minutes at 160° C., are subjected to the following tests:

| Test | Standard |
|---|---|
| Tensile strength (MPa) | DIN 53 504 |
| Elongation at rupture (%) | DIN 53 504 |
| Modulus of elasticity (MPa) | DIN 53 504 |
| Permanent elongation (%) | Internal Method (Measurement after 1 minute) |
| Tear propagation resistance according to Pohle (N/mm) | Internal Method (Ring Test) |
| Hardness (shore A) | DIN 50 505 |
| Compression set (%) | DIN 53 517 |

The test results are compared in Table 4:

TABLE 4

|  | Vulcanizate No. | | |
| --- | --- | --- | --- |
|  | 1 | 2 | 3 |
| Tensile strength | 3.8 | 8.1 | 8.4 |
| Elongation at rupture | 444 | 362 | 374 |
| Modulus of elasticity at 300% elongation | 2.6 | 7.4 | 7.5 |
| Permanent elongation | 23 | 10 | 10 |
| Tear propagation resistance | 8 | 14 | 13 |
| Hardness | 61 | 64 | 64 |
| Compression set 22 h at 70° C. | 35 | 16 | 15 |

The polymeric silicon compounds of this invention effect in sulfur-vulcanized EPDM mixtures a pronounced increase in crosslinking density, manifesting itself above all in the strong rise in modulus of elasticity and in a reduction of the permanent elongation, as well as compression set. Besides, tensile strength and tear propagation resistance are markedly increased.

EXAMPLE 16

The following mixtures on the basis of styrenebutadiene elastomer (SBR) are produced in an internal mixer:

TABLE 5

|  | Mixture No. | |
| --- | --- | --- |
|  | 4 | 5 |
|  | Parts by Weight | |
| SBR 1502 | 100.0 | 100.0 |
| Zinc oxide | 4.0 | 4.0 |
| Stearic acid | 2.0 | 2.0 |
| Highly disperse, precipitated silicic acid | 50.0 | 50.0 |
| Naphthenic mineral oil plasticizer | 5.0 | 5.0 |
| Polywax of molecular weight 4,000 | 2.0 | 2.0 |
| Product of Example 8 | — | 2.0 |
| Benzothiazyl-2-cyclohexyl-sulfenamide | 1.5 | 1.5 |
| Tetramethylthiuram disulfide | 0.5 | 0.5 |
| Sulfur | 2.0 | 2.0 |

Test specimens of 4 mm, vulcanized in a press at 150° C. for 20 minutes are examined according to Example 10. Table 6 compares the test results:

TABLE 6

|  | Vulcanizate No. | |
| --- | --- | --- |
|  | 4 | 5 |
| Tensile strength | 7.3 | 8.9 |
| Elongation at rupture | 494 | 366 |
| Modulus of elasticity at 300% elongation | 2.8 | 6.6 |
| Permanent elongation | 15 | 7 |
| Tear propagation resistance | 20 | 28 |
| Hardness | 63 | 70 |

Using the adhesion promoter of this invention, crosslinking density is markedly increased as compared with the comparison test without the product of this invention. The mechanical properties of the vulcanizates are improved.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing a homo- or copolymer of a 1,3-diene carrying reactive silyl groups and having 0.4–12% by weight of bound silicon consisting essentially of, reacting of 1,3-diene homo- or copolymer having a molecular weight ($\overline{M}n$) of 400–8,000 and containing less than 1% of its aliphatic double bonds in conjugation, at a temperature of 150°–300° C., with a silicon compound of the formula

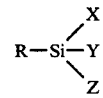

wherein
R is an unsaturated aliphatic hydrocarbon residue of 2–20 carbon atoms,
X is halogen, $C_{1-6}$ alkoxy, $C_{1-6}$alkoxyalkoxy, $C_{6-12}$ aryloxy, $C_{1-8}$ alkanoyloxy, $C_{1-6}$ ketoximato or $C_{1-12}$ hydrocarbylamido,
Y and Z independently are one of the X groups, hydrogen, alkyl of 1–8 carbon atoms, cycloalkyl of 5–12 carbon atoms, or optionally substituted phenyl.

2. A process of claim 1, wherein the reaction temperature is 200°–280° C.

3. A process of claim 1, wherein the starting diene polymer is a polybutadiene of a molecular weight (Mn) of 600–3,000.

4. A process of claim 1, wherein R in the silicon compound is vinyl or allyl.

5. A process of claim 4, wherein X in the silicon compound is halo or alkoxy.

6. A process of claim 4, wherein the bound silicon content is of the product is 1–5% by weight.

* * * * *